July 28, 1931. C. J. WAY 1,816,413

HANGER

Filed Dec. 17, 1930

WITNESS:
H. J. Stromberger

Inventor
CLARENCE J. WAY
By
Attorney

Patented July 28, 1931

1,816,413

UNITED STATES PATENT OFFICE

CLARENCE J. WAY, OF MANSFIELD, OHIO, ASSIGNOR TO THE OHIO BRASS COMPANY, OF MANSFIELD, OHIO, A CORPORATION OF NEW JERSEY

HANGER

Application filed December 17, 1930. Serial No. 502,952.

My invention relates to supports for hangers for conductors and especially for suspending a trolley wire from an overhead messenger cable.

The object of my invention is to provide a hanger which may be loosely attached to the messenger cable and fixedly secured to the conductor and which will support the conductor from the messenger cable by means of a flexible member and insulating the conductor from the cable.

My invention resides in the new and novel contruction, combination and relation of the various elements hereinafter described and shown in the attached drawings.

In the drawings:—

Fig. 4 shows a modification of Fig. 3 in which a wear member is included.

Figure 1:
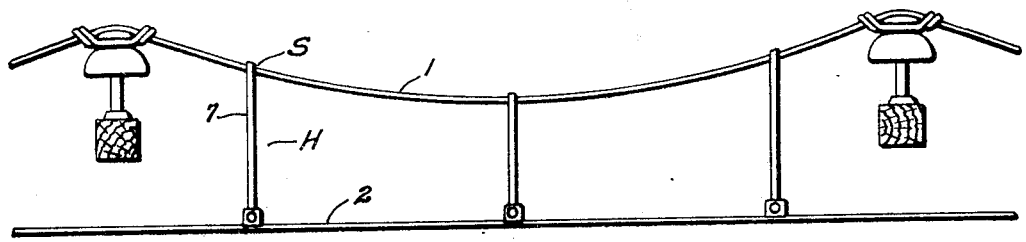
Fig. 1 is a side view of a span of what is generally termed a messenger construction showing the use of my invention.

In the past hangers of the type herein considered have been made as a rule of metal and it is found that due to electrolytic action between the hanger and the messenger cable and certain atmospheric conditions corrosion or eating away of the hanger and cable where the two contact is quite serious. The messenger cable 1 is usually of considerable capacity and employed as a conductor of the same polarity as the conductor 2 and current tends to flow from the cable 1 through the hanger H to the conductor 2, thus setting up an electrolytic action at the surfaces S.

To avoid this difficulty I have produced a device in which the supporting member is of a flexible insulating material thus eliminating flow of current at the contact surfaces from the cable 1 to the hanger H.

In the preferred embodiment of my invention I provide a two-part clamp composed of the members 3 and 4 and secured together by means of the screw 5 or other suitable means which will also place the clamp in gripping engagement with the conductor 2.

I have shown the member 3 as provided with a loop shaped attachment 6 having a slot 7 to receive a supporting member. While I have shown the loop as forming a part of the member 3 it is evident that a loop can also be provided on the member 4.

To suspend the clamp from a messenger cable I employ the elongated loop shaped member 7 which may be of woven material of finely formed strands thus producing a flexible member if the material is cotton or other fibrous material as hemp, silk, etc. It is apparent that this flexible member 7, if it was not desired to have it of insulating material, could be made of woven strands of copper, steel, bronze, etc., as such materials are now in common use. This would not, of course, eliminate the question of electrolytic or corrosion of the contact surfaces S, but it would give a form of flexible connection between the clamp and cable which, it is believed would be new and novel. I prefer to employ a braided or woven construction in the member 7, although it could be made of parallel strands bound together to maintain their relative position.

The member 7 may be impregnated with a flexible or yielding waterproofing material such as certain forms of varnish, asphalt, a rubber solution or partially vulcanized rubber and which will not detract materially from the flexibility of the member 7.

The member 7 is provided with separate ends 8 and 9 as it would be impossible to apply the device practically to the cable 1, at least if the member 7 formed a permanently closed loop, therefore I have shown the ends 8 and 9 as lapped and detachably secured together by means of a screw or other fastening device 10. Of course, if desired, the ends 8 and 9 may be secured together permanently after applying the device to the cable 1 by means of rivets in which case replacement would take place by cutting the member 7 which could easily be done with a knife if not entirely worn through and removed and replaced with a new member 7.

As there may be movement between the member 7 and the cable 1 which will cause chafing of the member 7 I may insert a sleeve 11 in the end of the loop which will resist wear better than the material of the member 7 and this member 11 may be of metal or it may be of insulating fibre generally composed of superimposed layers of treated paper. The member 11 may be held in place by means of a cement or rivets 12.

Figures 2, 3, 5:
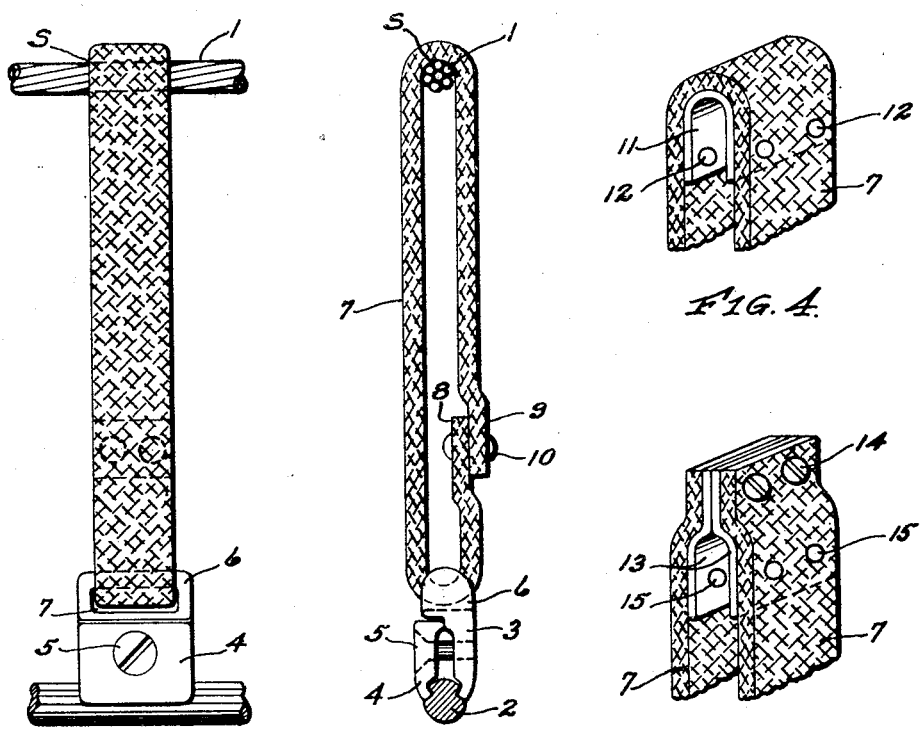
Fig. 2 is a side view of a form of my device.
Fig. 3 is an edge view of Fig. 2.
Fig. 5 is another modification of the suspending portion and as later described.

In Fig. 5 I have shown a modification of the member 7 in which the looped member is opened at the top and is lined with plates 13 which are the equivalent of the member 11 in Fig. 4 and the ends are held together by means of screws or rivets 14 and the plates are held in place by means of the rivets 15.

Of course there are many modifications of the member 7 which can be made as for instance, member 7 may consist of a single strand with separate loops, one at each end for attachment to the cable 1 and the attachment 6.

Having described my invention, I claim:—

1. A hanger comprising a metallic clamping member to receive and grip a conductor, a flexible loop shaped member of electrical insulating material to suspend the clamping member from a support and metallic members secured to the ends of the loop member to contact with the support.

2. A hanger comprising a pair of metallic clamping elements to receive and grip a conductor, means to hold the elements in clamping engagement with the conductor, a continuous flexible member of electrical insulating material to suspend the clamping elements from a support and means to secure the ends of the flexible member to prevent disengagement from the clamping elements and support.

3. A hanger comprising a pair of metallic clamping elements, means to secure the elements together and in gripping relation to a conductor, a flexible member of electrical insulating material to suspend the clamping elements from a support and having its ends secured against displacement at a point intermediate the support and clamp and means on one of the elements to which the flexible member is secured.

4. A hanger comprising a metallic clamping member to receive and grip a conductor and a loop shaped member of flexible insulating material to suspend the clamping member from a support.

5. A hanger comprising a metallic clamping member to receive and grip a conductor and a loop shaped member of flexible woven fabric to suspend the clamping member from a support in insulated relation thereto.

6. A hanger comprising a metallic clamping member to receive and grip a conductor and a flexible member of woven fabric to suspend the clamping member from a support and insulate it from the support and having its ends secured together to form a loop.

7. A hanger comprising a metallic clamping member to receive and hold a conductor and a flexible loop shaped member of woven fabric impregnated with a waterproofing and insulating material to suspend the clamping member from a support.

8. A hanger comprising a clamping member to receive and hold a conductor and a flexible member of woven non-metallic material secured to the clamping member to suspend the clamping member from a support.

9. A hanger comprising a clamping member to receive and grip a conductor, a flexible member of woven non-metallic material attached to the clamping member and to a support to suspend the clamping member from the support and a wear member secured to the flexible member to engage with the support.

10. A hanger comprising a clamping member to receive and hold a conductor, a flexible loop shaped member of insulating material and having separable ends to suspend the hanger from a support and means to secure the separable ends together to form a closed loop.

11. A hanger comprising a clamping member to grip a conductor and a flexible loop shaped member of woven electrical insulating material attached to the clamping member and arranged to be attached to or detached from a support at will to suspend the clamping member from the support.

12. A hanger comprising a clamping member to grip a conductor and a flexible loop shaped member composed of woven fabric and partially vulcanized rubber secured to the clamping member to suspend the clamping member from a support.

In testimony whereof I affix my signature.

CLARENCE J. WAY.